United States Patent
Hamel (10) Patent No.: US 11,535,073 B2
(45) Date of Patent: Dec. 27, 2022

(54) DUAL ENGINE AIR AND LAND MULTIMODAL VEHICLE

(71) Applicant: SkyRunner, LLC, Shreveport, LA (US)

(72) Inventor: Stewart Hamel, Shreveport, LA (US)

(73) Assignee: SkyRunner, LLC, Shreveport, LA (US)

( * ) Notice: Subject to any disclaimer, the term of this patent is extended or adjusted under 35 U.S.C. 154(b) by 0 days.

(21) Appl. No.: 15/889,056

(22) Filed: Feb. 5, 2018

(65) Prior Publication Data
US 2018/0304710 A1    Oct. 25, 2018

Related U.S. Application Data

(63) Continuation of application No. 15/339,504, filed on Oct. 31, 2016, now Pat. No. 9,884,530, which is a
(Continued)

(51) Int. Cl.
| | |
|---|---|
| *B60F 5/02* | (2006.01) |
| *B64C 37/00* | (2006.01) |
| *B60K 17/16* | (2006.01) |
| *B60K 5/02* | (2006.01) |
| *B60K 17/22* | (2006.01) |
| *B64C 31/036* | (2006.01) |

(52) U.S. Cl.
CPC ............ *B60F 5/02* (2013.01); *B60K 5/02* (2013.01); *B60K 17/16* (2013.01); *B60K 17/22* (2013.01); *B64C 37/00* (2013.01); *B60Y 2200/24* (2013.01); *B60Y 2200/50* (2013.01); *B60Y 2200/52* (2013.01); *B64C 31/036* (2013.01)

(58) Field of Classification Search
CPC ......... B60F 5/02; B64C 37/00; B64C 31/036; B64C 31/00; B64C 31/024; B64C 31/028; B60K 5/02; B60K 17/22; B60K 17/16; B60Y 2200/24; B60Y 2200/52; B60Y 2200/50
See application file for complete search history.

(56) References Cited

U.S. PATENT DOCUMENTS

| | | | | |
|---|---|---|---|---|
| 4,657,207 A | * | 4/1987 | Poling | B60F 5/02 180/7.4 |
| 5,160,100 A | * | 11/1992 | Snyder | B64C 31/036 244/13 |

(Continued)

OTHER PUBLICATIONS

Tim Watson, Motorcycle History: Shaft Drive, Nov. 22, 2013; https://www.rideapart.com/articles/255343/motorcycle-history-shaft-drive/; accessed Jun. 24, 2019 (Year: 2013).*

(Continued)

*Primary Examiner* — Medhat Badawi
*Assistant Examiner* — Vicente Rodriguez
(74) *Attorney, Agent, or Firm* — Polsinelli PC (57) ABSTRACT

An air and land multimodal vehicle comprises a frame, a propeller engine attached to a first location of the frame supplying power and torque to a propeller, a ground engine attached to a second location of the frame supplying power and torque to one or more ground traction elements, and a flexible wing releasably connectable to the frame, wherein the propeller engine is vertically and horizontally spaced from the ground engine.

17 Claims, 3 Drawing Sheets

Related U.S. Application Data continuation of application No. PCT/US2016/043613, filed on Jul. 22, 2016.

(60) Provisional application No. 62/358,353, filed on Jul. 5, 2016.

(56) References Cited

U.S. PATENT DOCUMENTS

| | | | | |
|---|---|---|---|---|
| 5,601,257 | A * | 2/1997 | McKann | B64C 27/10 |
| | | | | 244/17.19 |
| 6,877,690 | B1 * | 4/2005 | Bragg | B60F 5/02 |
| | | | | 244/2 |
| 7,984,782 | B2 * | 7/2011 | Platt | B60K 17/16 |
| | | | | 180/217 |
| 9,884,530 | B2 * | 2/2018 | Hamel | B60F 5/02 |
| 2007/0023566 | A1 * | 2/2007 | Howard | B60F 5/02 |
| | | | | 244/2 |
| 2011/0163197 | A1 * | 7/2011 | Farrag | B60F 5/02 |
| | | | | 244/2 |
| 2014/0060952 | A1 * | 3/2014 | Mizukura | B62M 7/00 |
| | | | | 180/231 |
| 2017/0225728 | A1 * | 8/2017 | Nolan | B60F 5/02 |

OTHER PUBLICATIONS

Wikipedia, Motorcycle transmission; https://en.wikipedia.org/wiki/Motorcycle_transmission; archived by Internet Archive on Jan. 17, 2016, https://web.archive.org/web/20160117152253/https://en.wikipedia.org/wiki/Motorcycle_transmission; accessed Jun. 24, 2019 (Year: 2016).*

* cited by examiner

DUAL ENGINE AIR AND LAND MULTIMODAL VEHICLE

CROSS REFERENCE TO RELATED APPLICATIONS/PRIORITY

The present invention is a continuation of U.S. Non-Provisional patent application Ser. No. 15/339,504 filed Oct. 31, 2016, which is a continuation from International Patent Application Number PCT/US2016/043613 filed Jul. 22, 2016, which claims priority and benefit to U.S. Provisional Patent Application No. 62/358,353 filed Jul. 5, 2016, each of the above applications is incorporated by reference into the present disclosure as if fully restated herein. To the extent that there is any conflict between the incorporated material and the present disclosure, the present disclosure will control.

BACKGROUND

Military and first responders have needs for transporting individuals into areas inaccessible by roads, and then maneuvering quickly on the ground over rough terrains, and then quickly and with minimal takeoff room, exiting the area. No vehicle has as of yet been devised that meets all of these requirements. For the foregoing reasons, there is a pressing, but seemingly irresolvable need for a vehicle with such functionality.

SUMMARY

Wherefore, it is an object of the present invention to overcome the above mentioned shortcomings and drawbacks associated with the current technology.

The present invention relates to methods and devices for air and land multimodal vehicles comprising a frame, a propeller engine attached to a first location of the frame supplying power and torque to a propeller, a ground engine attached to a second location of the frame supplying power and torque to one or more ground traction elements, and a flexible wing releasably connectable to the frame, wherein the propeller engine is vertically and horizontally spaced from the ground engine.

According to an additional embodiment, the flexible wing is a ram air parafoil, the ground engine does not supply torque to the propeller, and the propeller engine does not supply torque to the one or more ground traction elements.

According to an additional embodiment, the propeller engine and the ground engine are both aligned with a vertically extending medial plane of the multimodal vehicle bisecting the multimodal vehicle from the front of the vehicle to the back of the vehicle.

According to an additional embodiment, a horizontal rear axle plane extends parallel to the ground, and a rear axle and the ground engine lie in the horizontal rear axle plane. A continuously variable transmission may functionally connect the ground engine to the rear axle, and the continuously variable transmission may lie in the rear axle plane. It is understood that a standard transmission, including stick or paddle shift, or other automatic transmission may be used in the presently claimed invention. A drive shaft may extend from the continuously variable transmission and connect to a differential of the rear axle, the drive shaft transmitting power and torque from the continuously variable transmission to the rear axle and ground traction elements of the multimodal vehicle. The drive shaft may lie in the rear axle plane.

According to an additional embodiment, each of the propeller engine and the ground engine provides at least one of 65 horse power and at least 50 ft-lbs torque.

According to an additional embodiment, a surface area of the ram air parafoil is between 300 square feet and 650 square feet, and preferably between 500 square feet and 600 square feet.

According to an additional embodiment, one or more passenger seats are aligned with a vertically extending medial plane bisecting the multimodal vehicle from the front of the vehicle to the back of the vehicle. A first passenger seat and a second passenger seat may each be substantially bisected by the medial plane. The second passenger seat may be horizontally behind the first passenger seat and may be between 6 and 18 inches vertically higher than the first passenger seat, as measured from the substantially horizontal sitting portion of the seat.

While a propeller guard may be used, according to an additional embodiment, the propeller lacks a propeller guard.

According to an additional embodiment, the propeller engine and the ground engine operate on a same or common fuel. The propeller engine and the ground engine may be fluidly connected to a common fuel reservoir.

According to an additional embodiment, the ground engine extends at least 6 inches below a base of the frame and a base guard extends under the ground engine to protect the ground engine.

According to an additional embodiment, the propeller engine extends at between 3 inches and 8 inches behind a farthest portion of frame; a propeller centerline is between 15 inches and 25 inches above the ground engine, and the propeller engine is spaced 28 inches behind ground engine.

According to an additional embodiment, a takeoff distance is less than 300 feet, where takeoff is when the multimodal vehicle is supported by the wing and the ground traction elements are not in contact with the ground for a substantially prolonged period, of, for example, greater than 10 minutes, but more preferably greater than 30 minutes.

According to an additional embodiment, the multimodal vehicle has a dry weight of between 1,000 lbs and 1,450 lbs, preferably between 1,050 lbs and 1,200 lbs and more preferably between 1,075 lbs and 1,125 lbs, and the ground traction elements are one of wheels and tracks.

The multimodal vehicle is an ultimate first response, military, or recreational vehicle combining off-road functionality and adventure with powered paragliding freedom from roads. It can be transformed from a powersports off road vehicle to a light-sports aircraft in a matter of minutes using ram-air parafoil wing technology. With relatively short takeoff and landing needs, open fields, grass strips and secluded beaches become possible runways. Once airborne, the multimodal vehicle can preferably reach air speeds of at least 50 mph, and can soar at altitudes of 3,000 feet or more. The multimodal vehicle is also an ultimate sightseeing recreational aircraft that offers an exhilarating experience and true sense of adventure. The multimodal vehicle allows pilots to see the world from a low vantage point that is not safely attainable by most fixed-wing airplanes.

According to one embodiment the body has an angular appearance and exposed tubular exoskeleton, the multimodal vehicle is stylishly capable, without compromise. The body construction uses seamless air-hardened, heat-treated steel tubing to achieve immense strength allied to lower weight penalties. The open architecture delivers a stripped back driving experience that leaps into the cockpit for an exhilarating ride expressively combining sporty handling with a balance that is surefooted and stable. The multimodal vehicle's preferable pressurized-nitrogen inverted double wishbone suspension partners its inherent chassis/frame control, which helps in handling either rough roads or sharp corners with equal poise and supple precision.

Similar to a fighter jet, according to one embodiment, pilot and passenger are seated in-line for optimal performance and balance. The multimodal vehicle's open cockpit design provides superb high-visibility for increased safety and enjoyment of the world around the pilot. The logical instrument layout, preferably devoid of distracting dials, switches and buttons keeps the pilot focus where it belongs—outside.

Once airborne, the multimodal vehicle preferably has only two flight controls—handles for left and right steering (roll) and a throttle handle or pedal to climb or descend (pitch). This intuitive flight system makes the multimodal vehicle one of the easiest and safest forms of flight to master and offers an unmatched flying experience.

The following six paragraphs describe a preferred embodiment: The frame is constructed of a 41xx steel, such as 4130 chromoly steel, with a 1.5" diameter roll cage. There is an adjustable steering wheel. The front suspension has 9" travel dual A-arm with Fox™ 1.5 Podium™ shocks. The rear suspension has 12" travel dual A-arm with Fox™ 2.0 Podium™ C shocks. The front tires are Maxxis Bighorn™ Radial ATV Tire 29 x 9-14. The rear tires are Maxxis Bighorn™ Radial ATV Tire 29 x 11-14, and the wheels are Aluminum. The multimodal vehicle seats two inline.

The dry weight of the multimodal vehicle is approximately 1,100 lbs (500 kg), but can be more with optional equipment added. The length×width×height may measure approximately 162"×72"×77" (426 cm×183 cm×195 cm). The wheelbase is approximately 72" (183 cm). The ground clearance from the ground to the base of the frame is approximately 13"-15" (38 cm). The payload capacity is preferably a minimum of 350 lbs (159 kg) and a maximum of 600 lbs. The two fuel tanks preferably hold a minimum of 15 gal (56 L) and a maximum of 45 gal.

The multimodal vehicle preferably includes a PD Sunriser 550 ram-air parafoil wing. The propeller engine is monitored with an engine monitoring system (EMS) with a Dynon™ D-10. A VHF Radio is preferably included, along with light emitting diode (LED), Position & Strobe Lights, Aux 1, Aux 2, Aux 3, and Aux 4 rocker switched. The throttle is a throttle quadrant with mixture control. Preferably an altimeter rated to 20,000 ft is included.

The multimodal vehicle preferably has a maximum ground speed of at least 70 mph 61 knots 112 k/h, a maximum air speed of at least 50 mph 43 knots 80 k/h, an average or cruising air speed of 40 mph 34.7 knots 64 k/h, a ground range of at least 240 miles (386 km) per fuel fill up, a flight range of at least 140 miles (225 km) per fuel fill up, a takeoff and landing distance of 300 ft MSL or less, and a thrust of at least 525 lbs (238 kg).

According to the described embodiment the propeller engine is a 100 hp Rotax™ 912 ULS, 4 cylinder, 4 stroke with opposed cylinders, a carbureted fuel system and 135 cc of displacement. The propeller engine is cooled with liquid and air, has a gearbox, integrated reduction gear i=2.43, and an electric starter. The flight instrumentation preferably includes Oil Temp, Oil Pressure, Fuel, Amps, RPM, EGT, CHT, Coolant Temp, Coolant Pressure, OAT, Carb Temp, and Volts. The propeller engine has a takeoff speed approximately 5,800 rpm (5 min. max), a maximum continuous speed of approximately 5,500 rpm, and an idle speed of approximately 1,400 rpm. The maximum safe cylinder head temperature (CHT) is around 150 C (300 F). The exhaust gas temperature is normal at 1,472 F and has a maximum at 1,652 F, measured 4-6" from the exhaust valve and 2" from the propeller engine. The coolant pressure is preferably 12-17 PSI, normal 58 PSI, maximum 72 PSI, minimum 22 PSI@2,800 rpm, and with a cold start the max is 102 PSI. The most favorable operating oil temperature is between 190-230 F (90-110 C). The fuel pressure is preferably 5.8 PSI.

According to the described embodiment, the ground engine is an 89 hp, 4-Stroke single overhead cam (SOHC) Twin Cylinder, 952 cc, liquid cooled, electronic fuel Injected engine. The drivetrain is preferably two wheel drive (2WD) (preferably rear wheels), but it may be converted to a front wheel drive or a four wheel drive (4WD). There is preferably a digital screen control, with a digital gauge, speedometer, odometer, global positioning system (GPS) touchscreen tachometer, two trip meters, Hour Meter, Clock, Service Time, Diagnostic Indicator, Gear Indicator, Fuel Gauge, Hi-Temp/Low-Batt Lights, and a direct current (DC) Outlet.

Various objects, features, aspects, and advantages of the present invention will become more apparent from the following detailed description of preferred embodiments of the invention, along with the accompanying drawings in which like numerals represent like components. The present invention may address one or more of the problems and deficiencies of the current technology discussed above. However, it is contemplated that the invention may prove useful in addressing other problems and deficiencies in a number of technical areas. Therefore the claimed invention should not necessarily be construed as limited to addressing any of the particular problems or deficiencies discussed herein.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention. The invention will now be described, by way of example, with reference to the accompanying drawings in which.

DETAILED DESCRIPTION

The present invention will be understood by reference to the following detailed description, which should be read in conjunction with the appended drawings. It is to be appreciated that the following detailed description of various embodiments is by way of example only and is not meant to limit, in any way, the scope of the present invention. In the summary above, in the following detailed description, in the claims below, and in the accompanying drawings, reference is made to particular features (including method steps) of the present invention. It is to be understood that the disclosure of the invention in this specification includes all possible combinations of such particular features, not just those explicitly described. For example, where a particular feature is disclosed in the context of a particular aspect or embodiment of the invention or a particular claim, that feature can also be used, to the extent possible, in combination with and/or in the context of other particular aspects and embodiments of the invention, and in the invention generally. The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm. The embodiments set forth the below represent the necessary information to enable those skilled in the art to practice the invention and illustrate the best mode of practicing the invention. In addition, the invention does not require that all the advantageous features and all the advantages need to be incorporated into every embodiment of the invention.

Figure 1:
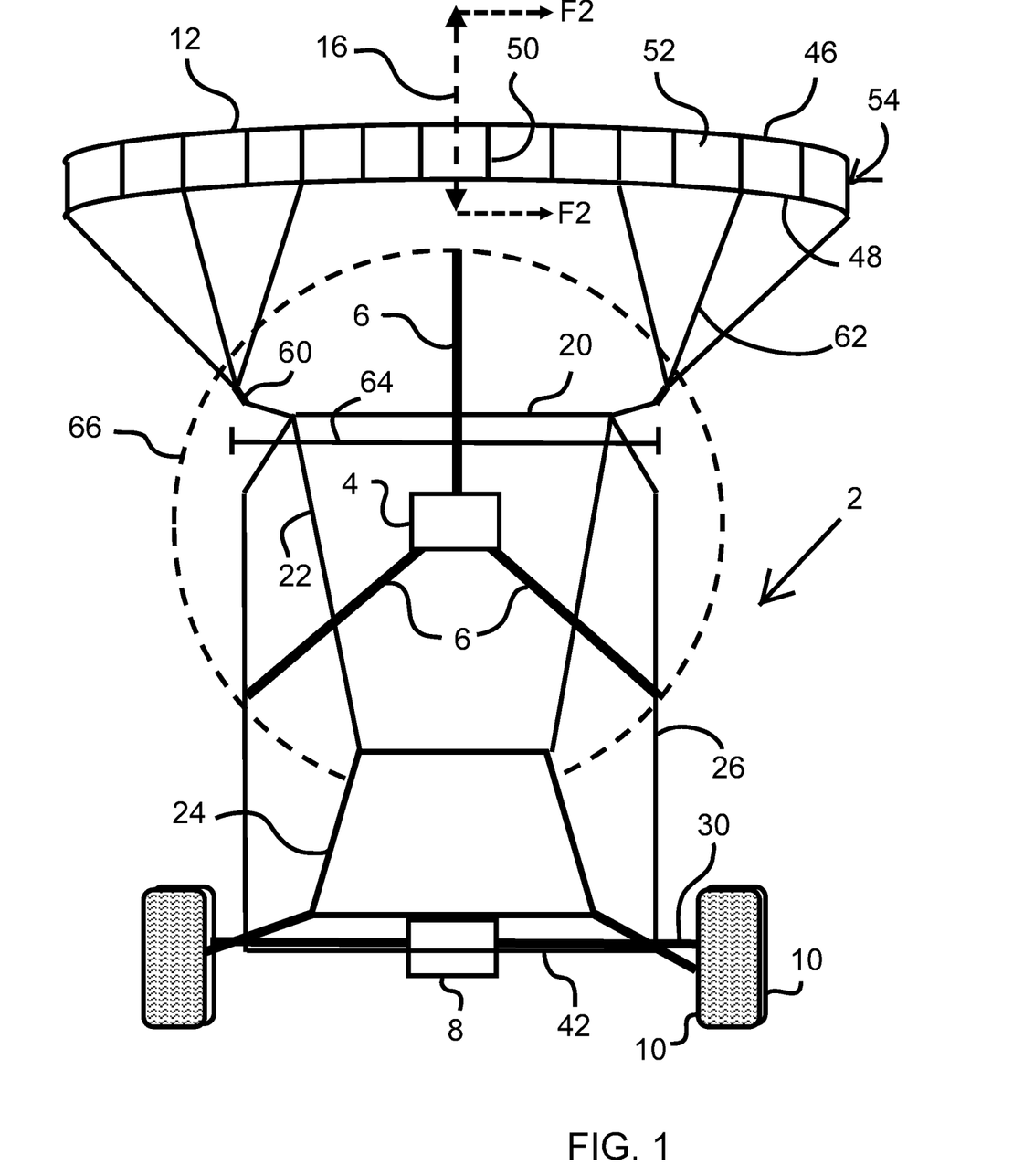
FIG. 1 is a schematic front plan view of a multimodal vehicle according to the present invention, with the seats not shown for added clarity.

Turning now to FIG. 1, a brief description concerning the various components of the present invention will now be briefly discussed. As can be seen in this embodiment, the invention relates to dual engine air and land multimodal vehicles 2 comprising a propeller engine 4 powering a propeller 6, a ground engine 8 powering ground traction elements 10 such as wheels or tracks, and a flexible wing 12. The propeller engine 4 and the ground engine 8 are separately mounted and provide separate power. The multimodal vehicle 2 preferably has at least a first seat 14 for one passenger aligned with a midline plane 16 of the multimodal vehicle 16, or a first and a second seat 14, 18 for two passenger, preferably in arranged tandem with both seats 14, 18 aligned with the midline plane 16 of the multimodal vehicle 2. If there are two passengers, the passenger in the front first seat 14 is preferably the driver and the passenger in the back second seat 18 preferably is seated behind and higher than the driving passenger in the front first seat 14. This allows the rear passenger to have a better line of sight, which is especially important to military users, when the passenger in the second seat 18 may be operating a weapon to defend the multimodal vehicle 2.

Figure 2:
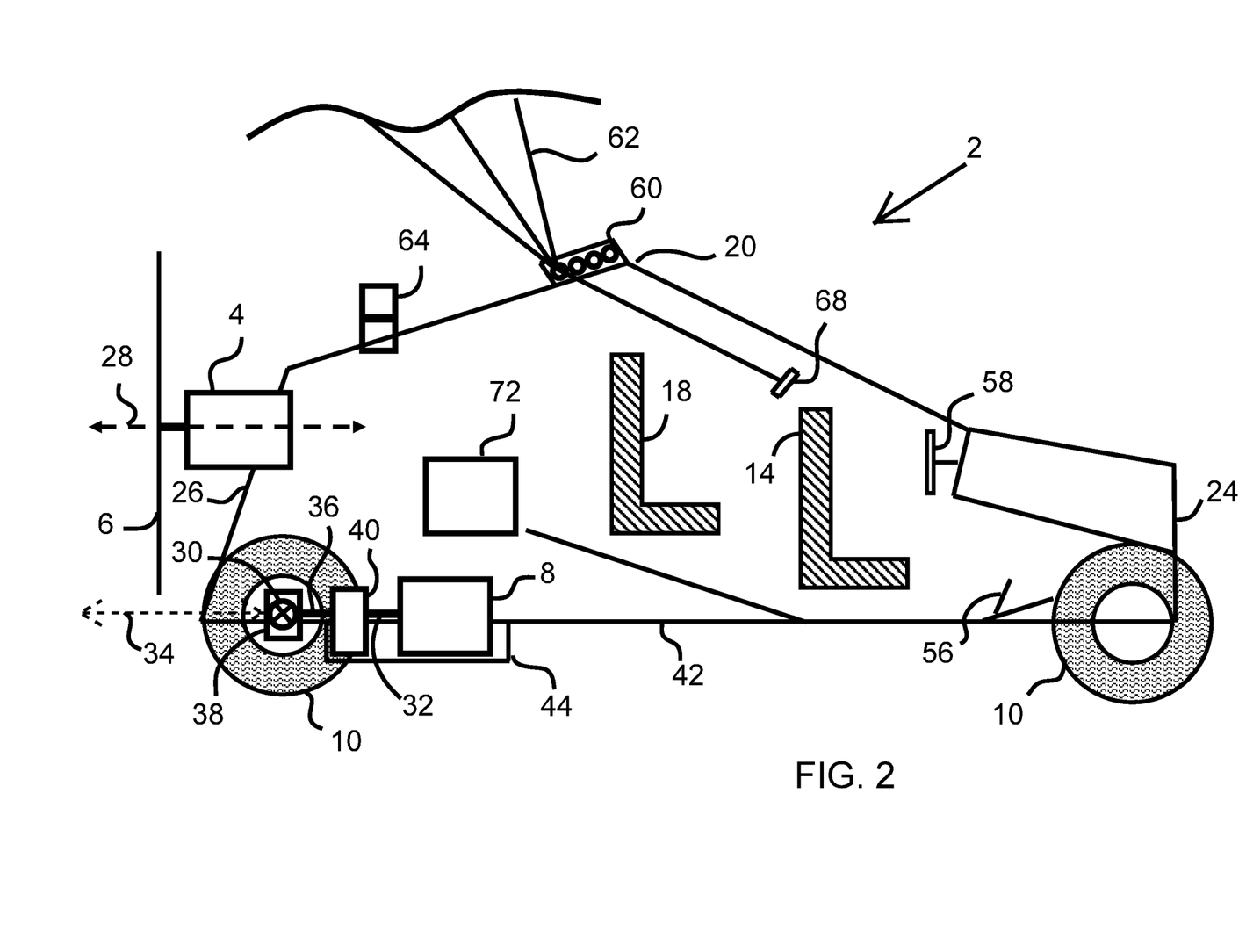
FIG. 2 is a schematic cross-sectional side plan view the multimodal vehicle of FIG. 1 in the direction marked F2, with the wing omitted.
Figure 3:
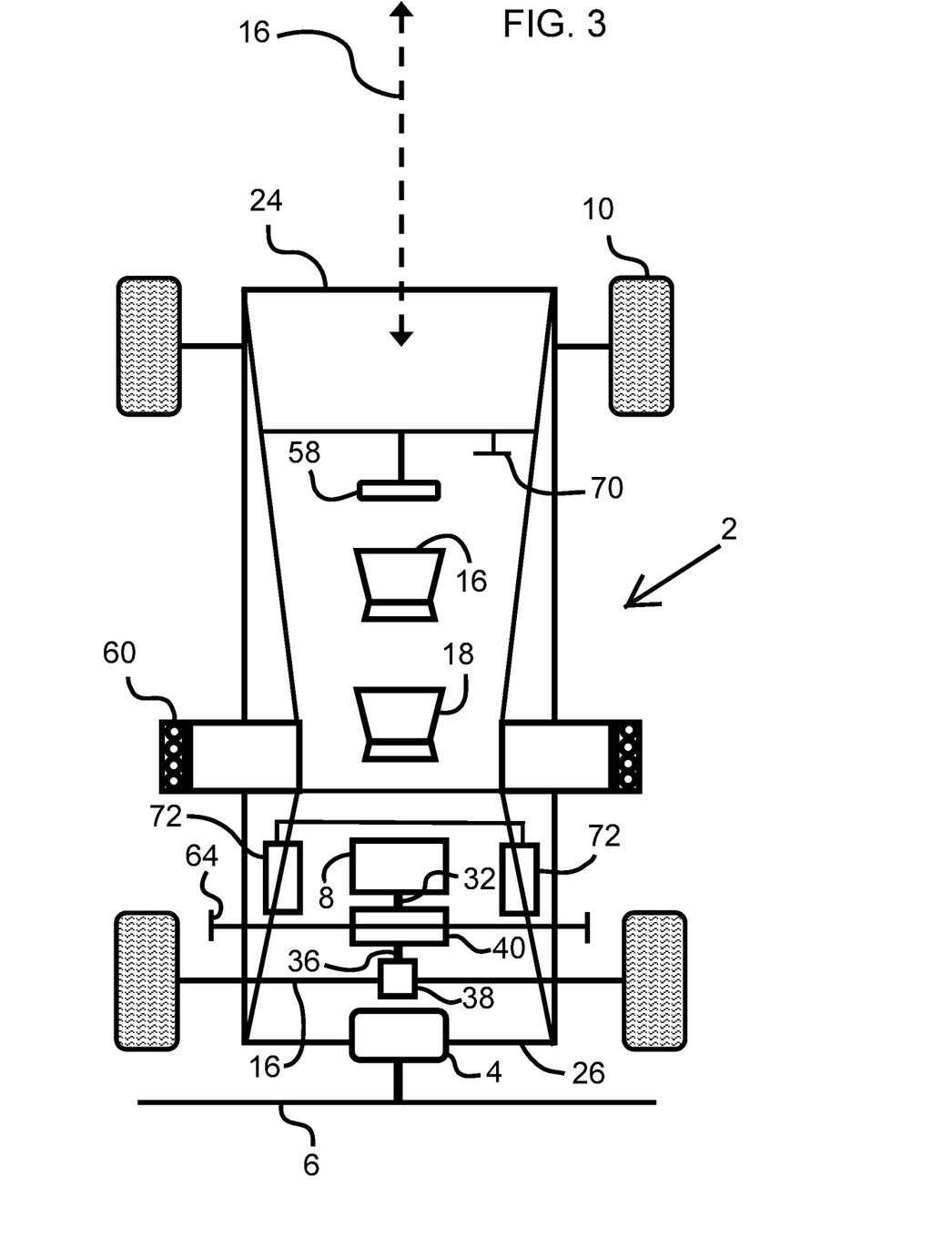
FIG. 3 is a schematic top plan view of the multimodal vehicle of FIG. 1 with the wing omitted for clarity.

FRAME: The vehicle is approximately 77" high, measuring from the top 20 of the frame 22 to the ground, with inflated 29" tires 10. The multimodal vehicle frame 22 is about 58" wide at its widest part, about 155" long from a front 24 of the frame 22 to a back 24 of the frame 22, with the front 24 being with relation to the forward driving direction of the multimodal vehicle 2. The multimodal vehicle 2 preferably weighs between about 1,000 lb and 1,450 lb, and more preferably between 1,050 lb and 1,150 lb.

GROUND ENGINE: The ground engine 8 is preferably an internal combustion engine, preferably with a power to weight ratio of approximately 0.4 hp/lb of weight or greater (hp and torque values are max values unless otherwise stated). The ground engine 8 could be, for example a twin cylinder, single or double overhead cam, with 4 valves per cylinder, and twin balance shafts with a high flow airbox and dual bore throttle body such as an 89 hp, 66 ft-lb torque, 952 cc Prostar™ 1000, or a 110 hp, 70 ft lbs of torque, 999 cc Prostar™ RZR® XP 1000 EPS turbo, for example. The ground engine 8 could also be other internal combustion engines. The ground engine 8 is preferably at least 65 horse power and/or at least 50 ft-lbs torque, more preferably at least 75 horse power and/or at least 55 ft-lbs torque, most preferably at least 85 horse power and/or at least 65 ft-lbs torque. In further embodiments, the ground engine 8 could be one or more electric motors and or hybrid engines in addition to or in place of one or more internal combustion engines. In situations where the ground engine 8 includes multiple motors or engines powering the ground tractions elements 10, the total horse power and/or total torque powering all of the ground traction elements 10 will preferably be at least 65 horse power and/or at least 50 ft-lbs torque, more preferably at least 75 horse power and/or at least 55 ft-lbs torque, most preferably at least 85 horse power and/or at least 65 ft-lbs torque.

PROPELLER ENGINE: The propeller engine 4 is preferably an internal combustion engine, preferably with a power to weight ratio of approximately 0.6 hp/lb of weight or greater. The propeller engine 4 could be, for example, a normally aspirated, air- and water-cooled, horizontally opposed four-cylinder, four-stroke, gear reduction-drive engine commonly used on certified aircraft, light sport aircraft, ultralight aircraft and unmanned aerial vehicles, such as a Rotax® 912 100 hp, 1352 cc, with 97 ft-lbs torque engine, or a Rotax® 914 115 hp 1211 cc engine, or a four-cylinder four-stroke, horizontally-opposed, turbocharged, air and liquid-cooled, gasoline engine design, with a mechanical gearbox reduction drive, and with a turbocharger having a compression ratio of 3.5:1 and a critical altitude of 15,000 ft (4,572 m), employing dual electronically controlled fuel injection, using dual channel Rockwell Collins® ECUs, with dual ignition, such as a Rotax® 915 iS 135 hp engine. The propeller engine 2 could be other internal combustion engines. The propeller engine 2 is preferably at least 65 horse power and/or at least 50 ft-lbs torque, more preferably at least 75 horse power and/or at least 55 ft-lbs torque, most preferably at least 85 horse power and/or at least 65 ft-lbs torque. In further embodiments, the propeller engine 4 could be one or more electric motors and or hybrid engines in addition to or in place of one or more internal combustion engines. In situations where the propeller engine 4 includes multiple motors or engines powering the propeller, the total horse power or total torque powering the propeller will preferably be at least 65 horse power and/or at least 50 ft-lbs torque, more preferably at least 75 horse power and/or at least 55 ft-lbs torque, most preferably at least 85 horse power and/or at least 65 ft-lbs torque.

The propeller engine 2 is preferably located adjacent to the back 26 of the multimodal vehicle 2, along the vertical midline plane 16, and attached to the propeller 6. The propeller engine 4 preferably extends about 4 inches behind the farthest back 26 portion of frame 22, which aids in allowing normal flex room for the propeller 6 during operation of the multimodal vehicle 2 without striking the frame 22 or the wheels or tracks 10. A propeller centerline 28 is preferably 20 inches above the ground engine 8. The propeller engine 2 is preferably axially spaced behind and vertically spaced above the ground engine 8. In a preferred embodiment the propeller engine is spaced 28 inches behind ground engine 6.

ENGINES LOCATION: The ground engine 6 is preferably at least 15 inches forward of the propeller 6. In the preferred embodiment the ground engine 8 is at least 21 inches forward of a back 26 of the frame 22 and at least 6 inches forward of a rear axle 30. The ground engine 8 is preferably centered along a midline plane 16. The crankshaft 32 of the ground engine 8 is preferably parallel to and co-planar along a horizontal rear axle plane 34 as the drive shaft 36. Alternatively the crankshaft 32 may be co-axial with the drive shaft 36. The drive shaft 36 is preferably orthogonal to the rear axle 30, and intersects the rear axle 30 at the rear differential 38. In a preferred embodiment, the ground engine 8 passes torque and speed through the crankshaft 32 to a continuously variable transmission 40, which changes speed and torque as desired. The continuously variable transmission 40 and the ground engine 8 both preferably lie in the rear axle plane and the midline plane 16. Though a continuously variable transmission 40 is preferred, other transmissions 40 such as transmissions having multiple defined gears may also be used. The continuously variable transmission 40 passes the torque and speed to drive shaft 36, which then passes it to the rear differential 38, then to the rear axle 30, and then to the wheel or track ground traction elements 10. The ground engine 8 preferably extends between 8 and 15 inches and more preferably 12 inches below a base 42 of the frame 22. The ground engine 8 preferably extends between 4 and 12 inches and more preferably 8 inches below the rear axle 30. The ground engine is preferably between 16 and 9 inches and more preferably 12 inches above the ground. A base guard 44 may extend under the ground engine 8 to provide a level of protection for the ground engine 8 from ground obstacles during off road driving. By nature of the ground engine 8 being lower and forward of the back 26 of the frame 22, the multimodal vehicle 2 is made more stable for driving off road by moving the center of gravity lower and toward the center of the multimodal vehicle 2. If the ground engine 8 were spaced even further from the rear axle 30 though, the multimodal vehicle 2 would disadvantageously be required to take on more weight from because a longer drive shaft 36 would be required. The ground engine 8 and the ground traction elements 10 are preferably not mechanically functionally connected to the propeller engine 4. The propeller is preferably not mechanically functionally connected to the ground engine 8. This provides for more simplistic designs, less parts, and a lighter dual engine multimodal vehicle 2.

The value of separate propeller and ground engines 4, 8 includes redundancy, reliability, serviceability and reduced take-off roll, especially for government agencies, via using both engines 4, 8 during takeoff. Additional benefits conferred are a greater longevity of parts, a lower center of gravity and increased stability during off-road and in the air.

Some design logic of the dual engine design are increased reliability, redundancy, safety, simplicity, and serviceability. As to redundancy and reliability, the axels, differential 38, engines 4, 8, and tires 10 make it difficult for the multimodal vehicle 2 to become immobilized. With two engines 4, 8, failure to one does not necessarily mean failure to the multimodal vehicle 2. If the rear axle 30 is damaged, the multimodal vehicle 2 could continue to operate via the propeller engine 4. If one or both differentials 38 are lost, the multimodal vehicle 2 could still operate via the propeller engine 4. According to a preferred embodiment, the vehicle has attained higher ground speeds with the propeller engine 4 alone and the ground engine 8 in Neutral, versus the ground engine 8 alone. If one engine 4, 8 is lost, the second engine 4 8 will keep the multimodal vehicle 2 operational, at least for ground transportation, but if the propeller engine 4 is still operational, both ground and air transportation are still possible. For serviceability, the multimodal vehicle 2 preferably utilizes readily available parts, such as from the Polaris Company, which also brings parts familiarity to individuals servicing the multimodal vehicle 2, such as with certified Polaris techs, even though the multimodal vehicle 2 vehicle is novel and inventively different than anything a person of ordinary skill in the art has seen before. Additionally, by using readily available parts when possible to construct the multimodal vehicle 2, the multimodal vehicle 2 gains a level of global parts accessibility and servicing familiarity, even with the inventively new multimodal vehicle 2.

WING: The wing 12 is preferably a single rectangular ram-air parafoil 12, also called a ram-air parachute, measuring preferably between 500 and 600 square feet in surface area. The ram-air parafoil 12, when inflated, resembles a low aspect ratio wing. It is preferably entirely constructed from fabric with no rigid members. The wing 12 has upper and lower membrane surfaces 46, 48, an airfoil cross section, and a rectangular planform. The airfoil section is formed by airfoil shaped ribs 50 sewn chordwise between the upper and lower membrane surfaces 46, 48 at a number of spanwise intervals forming a series of cells 52. The surface area of the upper membrane surface 46 is understood to equal the surface area of the wing 12. The leading edge 54 of the wing 12 is preferably open over its entire length so that ram air pressure maintains the wing 12 shape. The ribs 50 usually have apertures cut in them. This allows the transmission of pressure from cell 52 to cell 52 during inflation and pressure equalization after. The fabric used in the manufacture of ram-air parafoils 12 is preferably substantially nonporous to avoid pressure loss during use.

OPERATION: With the wing 12 stowed, the multimodal vehicle 2 may be driven on the ground as an all-terrain vehicle, off road over rough terrain and at speeds up to 70 mph or more carrying a payload of around 350 lbs. This ability to accelerate quickly and drive off road at high speeds is especially important to military and first responders. The multimodal vehicle 2 preferably drives with typical automobile controls such as foot accelerator and foot brakes 56 to control the ground speed, and a steering wheel 58 to turn the direction of the front wheels 12.

To quickly convert from ground operation to flying, the multimodal vehicle 2 is preferably stopped and the wing 12 is attached to the vehicle at the center of gravity (CG) bracket 60 via cords 62. A distance between the two CG brackets 62 on either side of the multimodal vehicle 2 is preferably between 55 and 70 inches, more preferably approximately 60 inches. With the propeller 6 stationary (not rotating), the wing 12 is then stretched out behind the multimodal vehicle 2, with the chords 62 over the fin 64. The ground engine 8 is then engaged and the multimodal vehicle 2 accelerates forward. The wing 12 quickly inflates and rises above the multimodal vehicle 2 moving the cords out of the propeller path 66. The distance separating the two CG brackets 60 is preferably are more narrow than the width of the propeller path 66. The propeller engine 4 may then be engaged to turn the propeller 6 in addition to the ground engine 8 directly powering the wheels 10 to even more rapidly accelerate the multimodal vehicle 2 and approach a lift velocity. Normally, in less than 300 feet the multimodal vehicle 2 will take flight, the ground engine 8 may be turned off, and the multimodal vehicle 2 will be powered by the propeller engine 4 turning the propeller 6. Such a fast and short distance take off is important to military and first responders when time is of the essence and only limited substantially flat terrain may be available. Also, this dual engine method of take-off allows for no prop-guard to be used, which saves unnecessary weight from the multimodal vehicle 2. The multimodal vehicle 2 may also take-off and fly without a mast or other rigid wing attachments to hold up the wing 12, which can be dangerous to the propeller 4 if the mast breaks off during flight, which would take additional precious time to set up, which would constitute additional weight, and which would likely rub on the wing 12 and cause premature rips or other failure in the wing 12. Once in flight, the multimodal vehicle preferably requires only two flight controls—handles for left and right steering and throttle to climb or descend. The throttle may be a peddle or a hand throttle 70.

The multimodal vehicle 2 preferably has two fuel tanks 72, one placed on each side of the multimodal vehicle 2, to power the ground engine 8 and the propeller engine 4. The two fuel tanks 72 are preferably filled with a common fuel for both ground and propeller engines 4, 8. The two fuel tanks 72 may be fluidly connected to one another, such that fuel from either tank may go to either engine 4, 8, so that the maximum range may be obtained from the multimodal vehicle 2 no matter what mode the multimodal vehicle 2 travels—ground or air. This is also a benefit to military and first responders, as it is not always predictable ahead of time what mode the multimodal vehicle 2 will need to travel in to best achieve a given mission.

The invention illustratively disclosed herein suitably may explicitly be practiced in the absence of any element which is not specifically disclosed herein. While various embodiments of the present invention have been described in detail, it is apparent that various modifications and alterations of those embodiments will occur to and be readily apparent those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items while only the terms "consisting of" and "consisting only of" are to be construed in the limitative sense.

What is claimed is:

1. A multimodal vehicle comprising:
   a frame, the frame extending a longitudinal length and a lateral width, the lateral width intersected by a longitudinal medial plane and the longitudinal length intersected by a lateral medial plane;
   a propeller engine attached to a first location of the frame, the propeller engine operable to supply power and torque to a propeller;
   a ground engine attached to a second location of the frame, the ground engine operable to supply power and torque to one or more ground traction elements;
   a horizontal rear axle plane which extends substantially parallel to the ground when the one or more ground traction elements are in contact with the ground, and the rear axle and the ground engine being disposed in the horizontal rear axle plane;
   a drive shaft coupled to the ground engine and extending in the horizontal rear axle plane to a differential of the rear axle, wherein the drive shaft is coupled at a rear of the ground engine that faces the differential;
   wherein the propeller engine is vertically and horizontally spaced apart from the ground engine;
   wherein the propeller engine and the ground engine are both aligned with the longitudinal medial plane;
   wherein the drive shaft coupled with the ground engine is substantially parallel to the longitudinal length of the frame,
   wherein at least a portion of the ground engine extends below a base of the frame.

2. The multimodal vehicle of claim 1, further comprising one or more seats coupled with the frame.

3. The multimodal vehicle of claim 2, wherein the one or more seats are aligned along the longitudinal medial plane.

4. The multimodal vehicle of claim 2, wherein the one or more seats comprises a first seat and a second seat displaced along the longitudinal medial plane from the first seat, wherein the first seat and second seat are operable to accommodate a passenger and the ground engine is mounted behind and below the second seat.

5. The multimodal vehicle of claim 1, wherein the drive shaft is substantially level relative to a bottom of the frame.

6. The multimodal vehicle of claim 1, further comprising a continuously variable transmission disposed between the ground engine and the drive shaft.

7. The multimodal vehicle of claim 1, further comprising a flexible wing releasably connectable to the frame.

8. The multimodal vehicle of claim 7, wherein the flexible wing is a parafoil.

9. The multimodal vehicle of claim 8, wherein the parafoil is a ram-air parafoil.

10. The multimodal vehicle of claim 1, wherein the lateral width is substantially bisected by the longitudinal medial plane and the longitudinal length is substantially bisected by the lateral medial plane.

11. The multimodal vehicle of claim 1, wherein the propeller engine and the ground engine are fluidly connected to a common fuel reservoir.

12. The multimodal vehicle of claim 1, wherein the ground engine has a crankshaft that is parallel to a centerline of the propeller.

13. The multimodal vehicle of claim 1, wherein a base guard extends under the ground engine to protect the ground engine.

14. A multimodal vehicle comprising:
   a frame, the frame extending a longitudinal length and a lateral width, the lateral width intersected by a longitudinal medial plane and the longitudinal length intersected by a lateral medial plane;

a propeller engine attached to a first location of the frame, the propeller engine operable to supply power and torque to a propeller;

a ground engine attached to a second location of the frame, the ground engine operable to supply power and torque to four or more ground traction elements;

a horizontal rear axle plane which extends substantially parallel to the ground when the one or more ground traction elements are in contact with the ground, and the rear axle and the ground engine being disposed in the horizontal rear axle plane;

a drive shaft coupled to the ground engine and extending in the horizontal rear axle plane to a differential of the rear axle;

wherein the propeller engine is vertically and horizontally spaced apart from the ground engine;

wherein the propeller engine and the ground engine are both aligned with the longitudinal medial plane;

wherein the drive shaft coupled with the ground engine is substantially parallel to the longitudinal length of the frame, wherein at least a portion of the ground engine extends below a base of the frame, a base guard coupled with the frame and extending under the portion of the ground engine extending below the frame.

15. The multimodal vehicle of claim 14, wherein the drive shaft is substantially level relative to a bottom of the frame.

16. The multimodal vehicle of claim 14, wherein the ground engine has a crankshaft that is parallel to a centerline of the propeller.

17. The multimodal vehicle of claim 14, further comprising a horizontal rear axle plane which extends parallel to the ground and relative to the ground when the one or more ground traction elements are in contact with the ground, and a rear axle and the ground engine lying in the horizontal rear axle plane.

* * * * *